United States Patent
Kung (10) Patent No.: US 6,240,779 B1
(45) Date of Patent: Jun. 5, 2001

(54) GRAVITY-TYPE HORIZONTAL SHIFT SENSING APPARATUS

(76) Inventor: Ching-hu Kung, 5F, No. 60, Lane 288, Chung-Kang Road, Hsin Chuang City, Taipei Hsien (TW)

( * ) Notice: Subject to any disclaimer, the term of this patent is extended or adjusted under 35 U.S.C. 154(b) by 0 days.

(21) Appl. No.: 09/348,058

(22) Filed: Jul. 6, 1999

(51) Int. Cl.[7] .............................. G01M 1/12; G01P 15/08; G01P 15/12
(52) U.S. Cl. ..................................... 73/382 R; 73/514.26; 73/514.33
(58) Field of Search .............................. 73/382 R, 382 G, 73/514.01, 514.26, 514.33; 200/61.45 R, 61.52

(56) References Cited

U.S. PATENT DOCUMENTS

| | | | |
|---|---|---|---|
| 3,477,293 | * 11/1969 | Brede et al. | 73/382 R |
| 3,486,379 | * 12/1969 | Brede et al. | 73/382 |
| 3,498,134 | * 3/1970 | Bulanzhe et al. | 73/382 |

* cited by examiner

Primary Examiner—Richard A. Moller
(74) Attorney, Agent, or Firm—Dougherty & Troxell (57) ABSTRACT

A gravity-type horizontal shift sensing apparatus being mounted on and moved along with an object for efficiently sensing and measuring any difference in angle of inclination of the object when the object moves. The apparatus includes two intersected rocking arms rotatably disposed between close-up inner cover and inner seat, and a weight suspended from the rocking arms. The rocking arm each is provided at one end outside the inner cover and the inner seat with a toothed wheel and an optical wheel associated with the toothed wheel. The toothed wheel meshes with a gear sideward projected from a wheel mounted to one side of the rocking arm. The wheel each also has an optical wheel associated therewith. Outer peripheries of the optical wheels on the rocking arms and the wheels respectively pass between two sensing elements mounted at two sides of recesses formed on the circuit board. When the object is shifted in its horizontal position, the weight automatically biases due to the gravitation and causes the optical wheels on the rocking arms and the wheels to rotate. And the sensing elements on the circuit board can efficiently sense and measure the horizontal shift of the object from the extent of rotation of the optical wheels.

5 Claims, 8 Drawing Sheets

GRAVITY-TYPE HORIZONTAL SHIFT SENSING APPARATUS

FIELD OF THE INVENTION

The present invention relates to a gravity-type horizontal shift sensing apparatus including two intersected rocking arms rotatably mounted in the apparatus and a weight freely suspended from the rocking arms to always maintain in a vertically downward position due to the gravitation. The rocking arm each is provided at one end with a toothed wheel with which a full circle of optical wheel is associated. When the weight biases due to any horizontal shift of the apparatus, the rocking arms and accordingly the optical wheels thereof are caused to sway. Such sway of the optical wheels can be efficiently sensed by phototransistors mounted on a circuit board.

BACKGROUND OF THE INVENTION

A horizontal shift sensing apparatus is mounted on and moved along with an object to sense and measure any difference in angle of inclination of the object when the object moves. The object may be a wheelchair, rocker, aircraft, and any vehicle and the apparatus helps horizontal adjustment of such objects with minimized manual manipulation.

Figure 1:
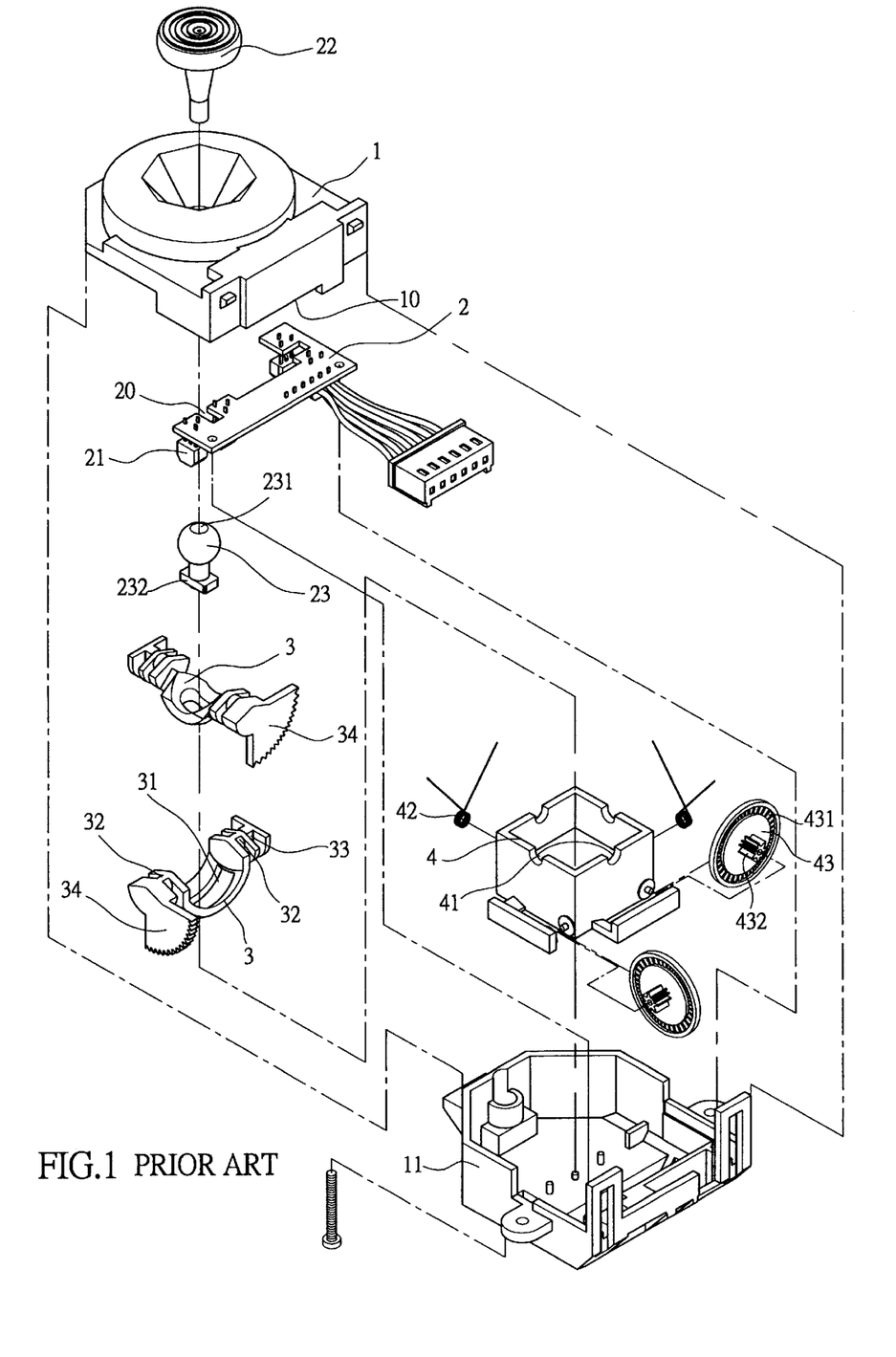
FIG. 1 is an exploded perspective of a conventional horizontal shift sensing apparatus.
Figure 2:
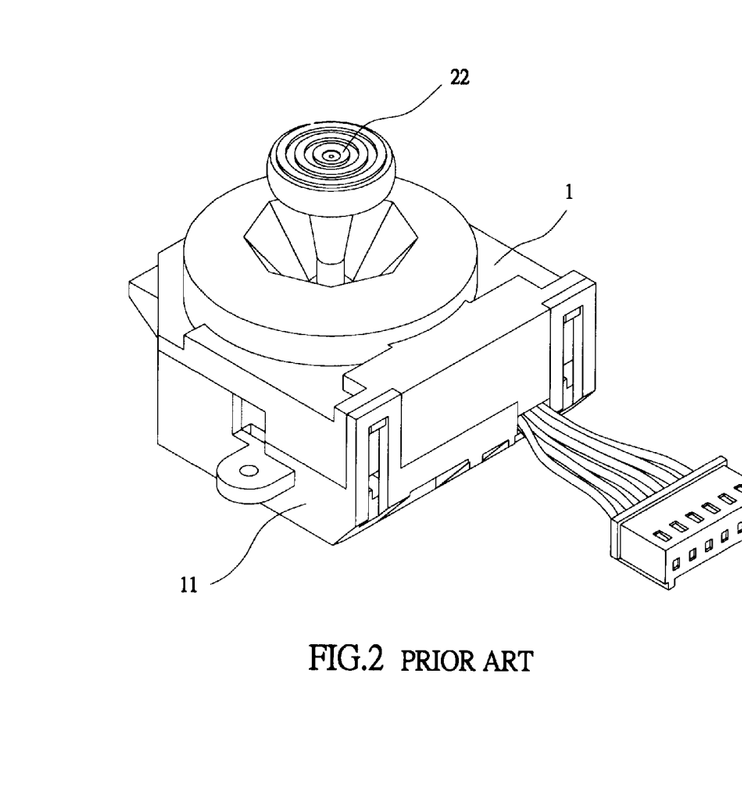
FIG. 2 is an assembled perspective of the conventional horizontal shift sensing apparatus of FIG. 1.

FIGS. 1 and 2 are exploded and assembled perspective views, respectively, of a conventional horizontal shift sensing apparatus. As shown, the conventional apparatus mainly includes close-up upper cover 1 and lower cover 11 that have inner seats 10 and 4, respectively. The inner seat 4 is formed on its upper edges with cuts 41. Two rocking arms 3 are separately rested across the inner seat 4 with reduced necks 32 provided at two ends thereof seated in the cuts 41, so that the rocking arms 3 intersect without touching each other. The rocking arm 3 each further has a recess 33 provided at one end outside the reduced neck 32 for a V-shaped spring 42 to engage thereinto, so that the V-shaped springs 42 always restore the biased rocking arms 3 to an original position. A toothed quarter sector 34 is provided at the other end of each rocking arm 3 opposite to the recess 33. A wheel 43 is mounted onto the inner seat 4 at one side of each rocking arm 3. Each wheel 43 has an optical wheel 431 associated therewith and a gear 432 sideward projected from a center of the wheel 43. The toothed quarter sector 34 meshes with the gear 432 and therefore rotates the wheel 43 and accordingly the optical wheel 431. To allow the rocking arms 3 to sway sideward or forward and backward, the rocking arms 3 have an arched middle portion provided with a through hole 31. A movable ball 23 having a top hole 231 and a T-shaped bottom member 232 is associated with the rocking arms 3 such that the T-shaped bottom member 232 is located below the through holes 31 of the two rocking arms 3. A rocker 22 is connected to the movable ball 23 by inserting a lower end thereof into the top hole 231 of the ball 23. A circuit board 2 provided with recesses 20 is disposed around the wheels 43, so that outer peripheries of the wheels 43 are located in the recesses 20. With these arrangements, when the rocker 22 sways, it brings the rocking arms 3 to sway. At this point, the toothed quarter sectors 34 on the rocking arms 3 rotate the wheels 43. The optical wheels 431 on the rotating wheels 43 move in the recesses 20 of the circuit board 2. Such movement of the optical wheels 431 is sensed by phototransistors 21 mounted on the circuit board 2 at two sides of the recesses 20 and converted into a value representing a distance of displacement of the rocker 22.

In the above-described conventional horizontal shift sensing apparatus, the rocker 22 is utilized to shift an object. However, the rocker 22 itself can not be actively controlled. Moreover, the wheels 43 are the only means to indicate the shift of the object and do not provide accurate result. And, since the rocking arms 3 are provided with only one toothed quarter sector 34 each, the quarter sectors 34 tend to disengage from the gears 432 and cause disorder of the wheels 43 when the rocking arms 3 are biased too much by the rocker 22. The conventional horizontal shift sensing apparatus can therefore be used in limited shifting range. In brief, the whole apparatus needs manual manipulation to drive other electronic elements in the apparatus, including resistances, phototransistors, etc. and has limited effects.

It is therefore desirable to develop an improved horizontal shift sensing apparatus to eliminate the drawbacks existing in the conventional apparatus.

SUMMARY OF THE INVENTION

A primary object of the present invention is to provide a gravity-type horizontal shift sensing apparatus that is mounted on an object and employs the principle of gravitation to automatically indicate any horizontal shift of the object through any difference in an angle of inclination of the object. Such difference in the angle of inclination can be sensitively and accurately transferred into circular movement that is sensed by electronic elements on a circuit board to help a user to adjust the object to a desired horizontal position. The gravity-type horizontal shift sensing apparatus of the present invention is fully free of any means for manual manipulation, such as a rocker.

BRIEF DESCRIPTION OF THE DRAWINGS

The technical means, features, and effects of the present invention may be best understood by referring to the following detailed description of the preferred embodiments and the accompanying drawings, wherein.

DETAILED DESCRIPTION OF THE PREFERRED EMBODIMENTS

Please refer to FIGS. 3 to 6 in which a gravity-type horizontal shift sensing apparatus according to a first embodiment of the present invention is shown. As shown, the apparatus mainly includes an upper cover 5, an inner cover 51, two rocking arms 6, a circuit board 8, a lower cover 54, and a weight 73.

The lower cover 54 is located below the upper cover 5 and provides an inner seat 55. The inner seat 55 has a centered support 552 for a ball 7 to be movably supported therein.

The ball 7 has a downward opened hole 71 formed at its bottom and a T-shaped head member 72 connected to a top thereof. The weight 73 is fixedly connected to a lower end of a long bar 731. An upper end of the long bar 731 upward extends through the centered support 552 of the lower cover 54 to insert into the bottom hole 71 of the ball 7, so that the weight 73 is suspended from the ball 7. The inner seat 55 of the lower cover 54 is provided on its upper edges with cuts 551 that are corresponding to cuts 52 formed on lower edges of the inner cover 51.

The rocking arms 6 are arched members and disposed between the inner cover 51 and the inner seat 55 to intersect each other. Each rocking arm 6 has a long slot 61 formed along an arched middle portion of the rocking arm 6 for a neck portion of the T-shaped head member to extend therethrough and therefore movably holding the ball 7 to and below the rocking arms 6. Two reduced necks 62 are separately provided on two shafts of the rocking arm 6 at two sides of the arched middle portion. The rocking arms 6 are disposed between the inner cover 51 and the inner seat 55 with the reduced necks 62 seated between the correspondingly formed cuts 52, 551 of the inner cover 51 and the inner seat 55, respectively, so that the rocking arms 6 are allowed to sway in the cuts 52, 551 and even to rotate by 360 degrees to the maximum.

The rocking arm 6 further includes a toothed wheel 63 provided to an outer end of its one shaft, so that the toothed wheel 63 is located outside the inner cover 51 and the inner seat 55. The toothed wheel 63 has a full circle of optical wheel 64 coaxially provided along an outer periphery of the toothed wheel 63.

Two wheels 53 are separately assembled onto outer side of the inner cover 51 to each locate at one side of one rocking arm 6. Each of the wheels 53 has a full circle of optical wheel 531 coaxially provided along an outer periphery thereof and a coaxial gear 532 outward projected from a center thereof. The wheels 53 are so positioned that the gears 532 separately mesh with the two toothed wheels 63 on the rocking arms 6.

The circuit board 8 is provided at predetermined positions with recesses 82. Sensing elements, such as phototransistors 81 or variable resistances 9, are provided on the circuit board 8 at two sides of each recess 82. When the apparatus of the present invention is assembled, each of the wheels 53 and the toothed wheels 63 on the rocking arms 6 will extend a part of their outer periphery into one recess 82 to locate between two sensing elements 81 or 9.

Figure 4:
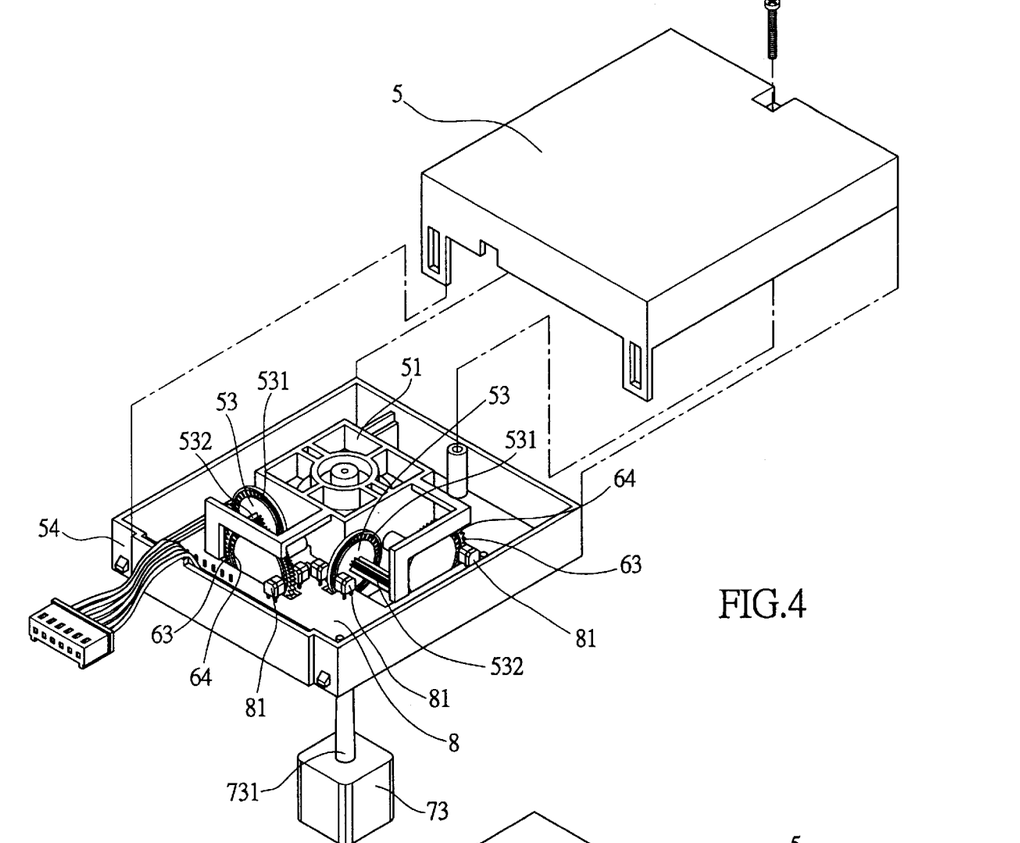
FIG. 4 is an assembled perspective of the gravity-type horizontal shift sensing apparatus of FIG. 3 with an upper cover thereof removed from the apparatus to show the internal structure thereof.
Figure 5:
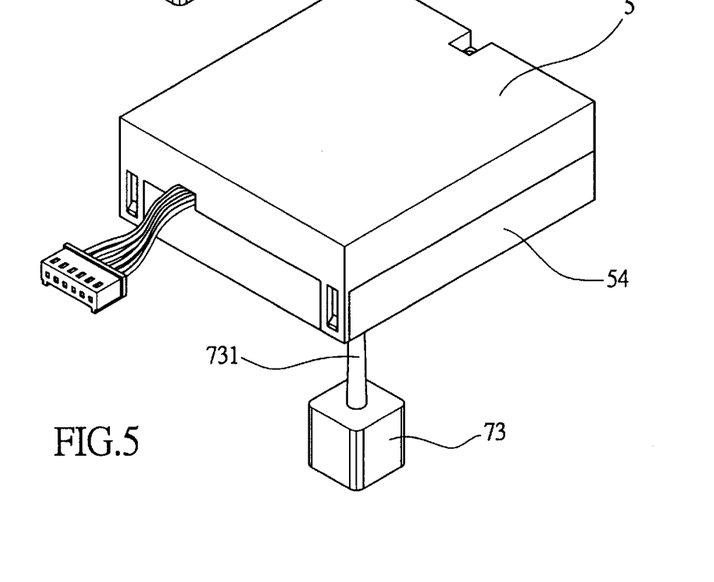
FIG. 5 is a perspective of the gravity-type horizontal shift sensing apparatus of FIG. 3 in a completely assembled state.
Figure 6:
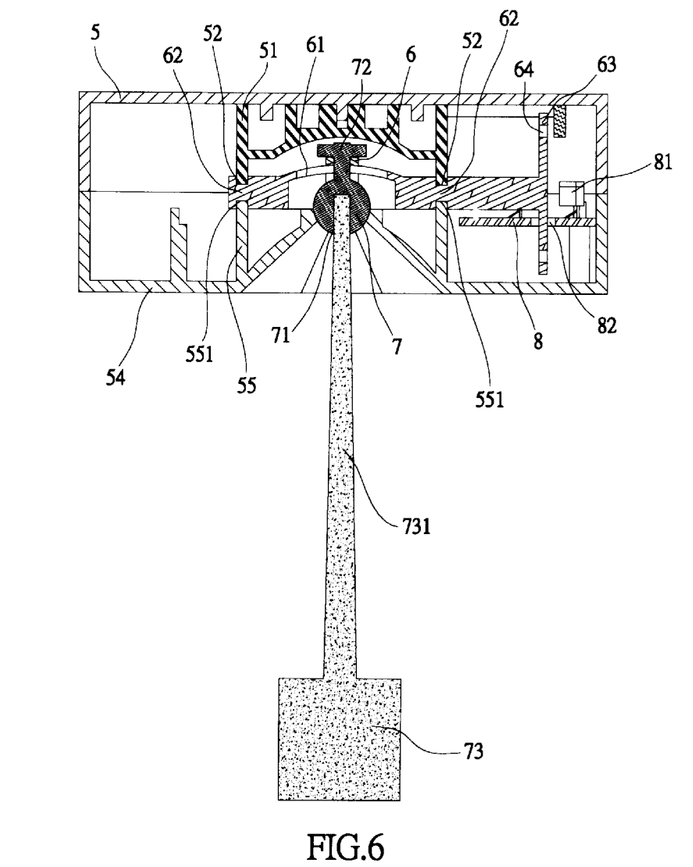
FIG. 6 is a side sectional view of the apparatus of FIG. 3 in an assembled state.
Figure 7:
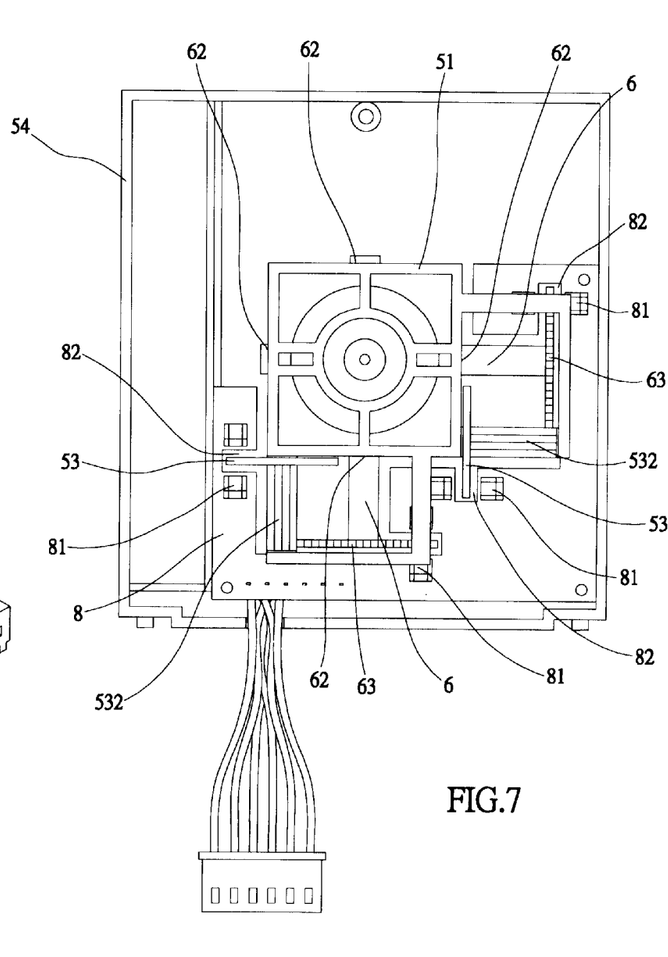
FIG. 7 is a top view of FIG. 4.

Please refer to FIGS. 4, 6 and 7 at the same time. As described above, the two intersected rocking arms 6 are disposed between the inner cover 51 and the inner seat 55 and supported in the cuts 52 and 551, and the ball 7 is supported in the support 552 centered at the inner seat 55 with the T-shaped head member 72 projected from and held to the long slots 61 of the two rocking arms 6 and the long bar 731 of the weight 73 upward inserted into the bottom hole 71 of the ball 7. The upper cover 5 is covered onto the lower covers 54 to form a housing enclosing the inner cover 51, the inner seat 55, the rocking arms 6, the wheels 53, the circuit board 8, and other relevant elements.

Whenever the housing formed from the upper and the lower covers 5 and 54 is shifted, the weight 73 automatically biases due to the gravitation and is always in a vertically downward position. That is, when the housing formed from the upper and the lower covers 5 and 54 is shifted, the weight 73 automatically senses a change in an angle of inclination of the housing and immediately alters its angular position relative to the housing. This arrangement allows the horizontal shift sensing apparatus of the present invention to actively and efficiently sense any inclination of an object on which the apparatus is mounted and help a user to adjust the position of the object without the need of using any manual manipulation means. When the ball 7 is brought by the biased weight 73 to move, it in turn causes the rocking arms 6 to sway. At this point, the toothed wheels 63 at one end of the rocking arms 6, and accordingly the full circle of optical wheels 64 on the toothed wheels 63, move in circumferential direction and bring the wheels 53 and the optical wheels 531 on the wheels 53 to also move in circumferential direction through the mesh of the toothed wheels 63 with the gears 532 on the wheels 53. The rotating optical wheels 64 and 531 together with the phototransistors 81 on the circuit board 8 provide twofold and synchronous measuring of horizontal shift of the object. The measurement is therefore very accurate. The toothed wheels 63 are in the form of a round disc and would therefore never disengage from the gears 532 no matter how the weight 73 would bias from its original position. The horizontal shift sensing apparatus of the present invention can therefore be adapted to a wide range of horizontal shift sensing and adjusting.

Figure 3:
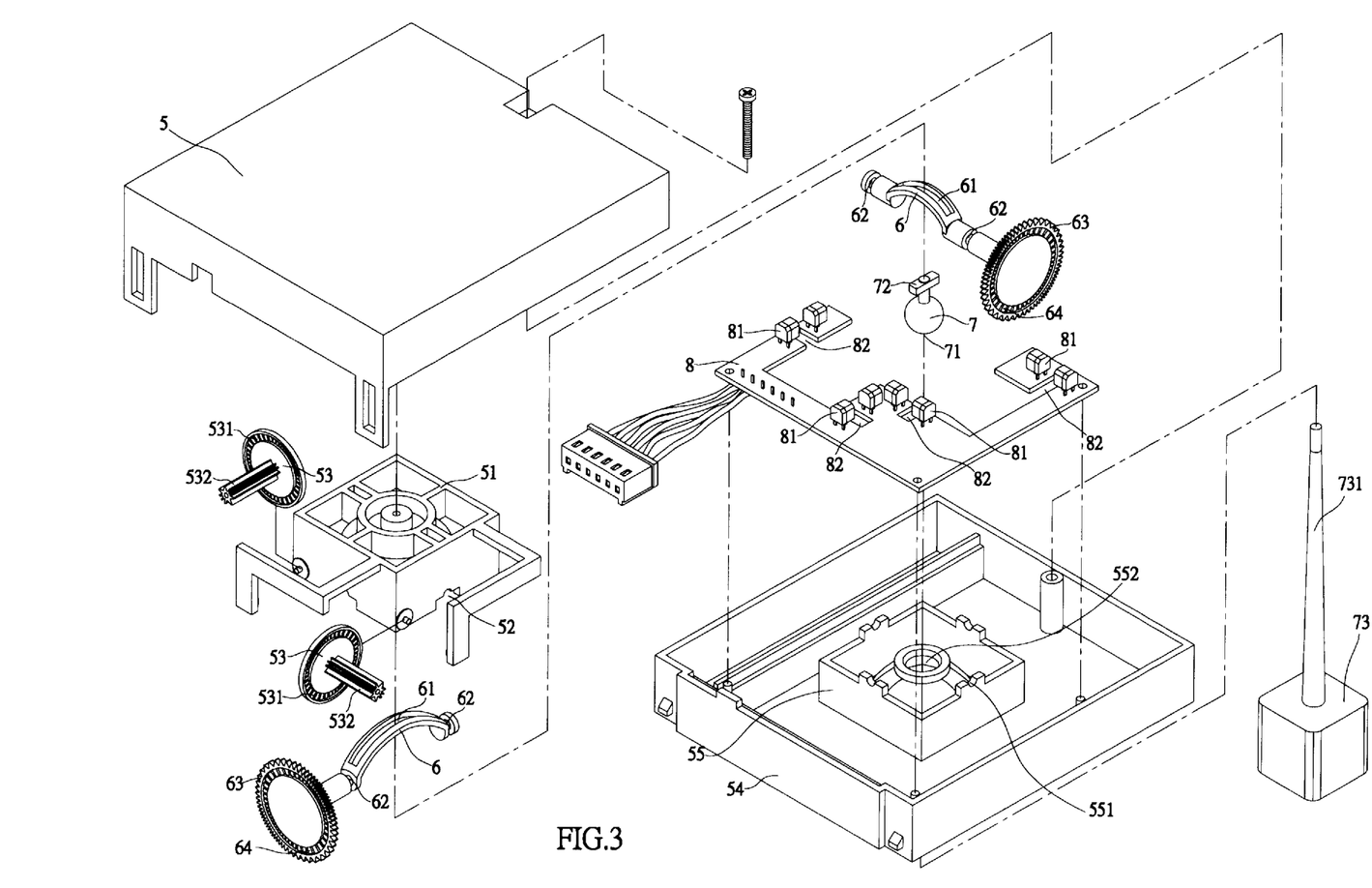
FIG. 3 is an exploded perspective of a gravity-type horizontal shift sensing apparatus according to the present invent ion.

The rocking arms 6 illustrated in FIG. 3 have upward arched middle portion. However, the rocking arms 6 are not necessarily limited to such a shape. Other embodiments of the present invention showing differently shaped rocking arms will be further discussed herein later.

Figure 8:
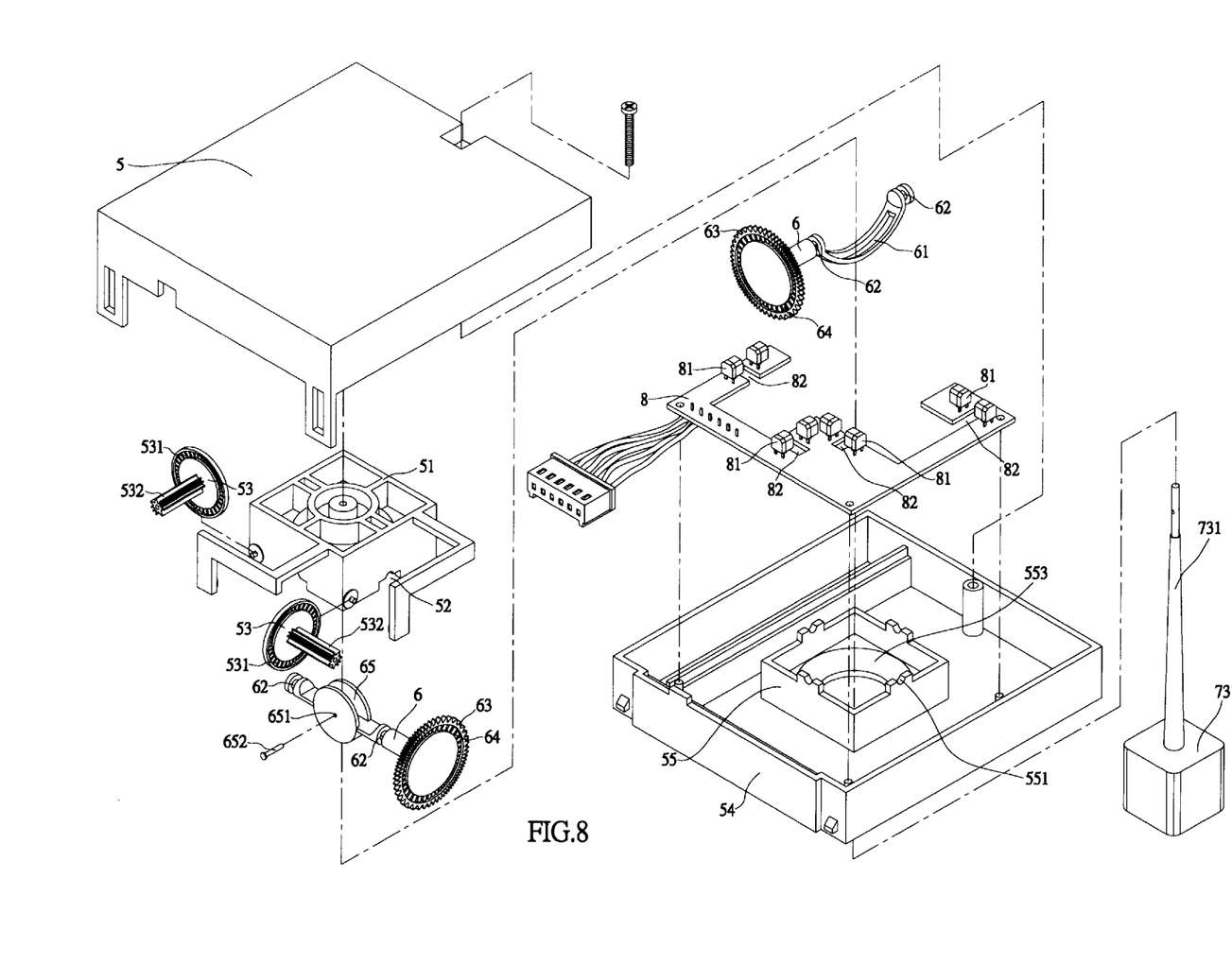
FIG. 8 is an exploded perspective of a gravity-type horizontal shift sensing apparatus according to another embodiment of the present invention.
Figure 9:
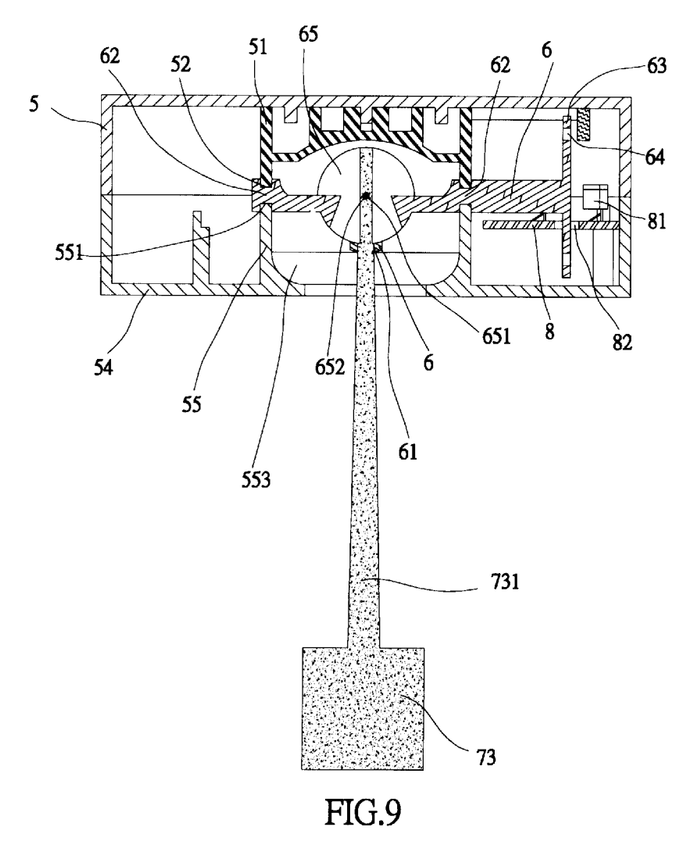
FIG. 9 is a side sectional view of the apparatus of FIG. 8 in an assembled state.

FIGS. 8 and 9 are exploded perspective and assembled side sectional views, respectively, of a second embodiment of the present invention. In this embodiment, there are also an upper cover 5, an inner cover 51, two intersected rocking arms 6, two wheels 53, a circuit board 8, a lower cover 54, and a weight 73 having a long bar 731. This second embodiment is different from the first embodiment in that there is not a ball 7 and the rocking arms 6 have a downward arched middle portion. The second embodiment is also characterized in that one rocking arm 6 that is at an upper position is provided at the arched middle portion with two parallelly spaced round discs 65. The discs 65 have central through holes 651 for a pin 652 to extend therethrough. Both rocking arms 6 have a long slot 61 formed along their respect arched middle portion, so that the long bar 731 of the weight 73 may be upward extended therethrough to locate between the two discs 65 and be pivotally connected thereto by threading the pin 652 through the central through holes 651 and a hole formed on a front portion of the long bar 731. That is, the weight 73 is allowed to smoothly sway relative to the rocking arms 6. Moreover, the inner seat 55 of the lower cover 54 in this embodiment provides a centered support 553 that has a widened lower opening, so that the long bar 731 would not touch and collide with the inner seat 55 when the weight 73 biases.

When the weight 73 biases under the gravitation due to any horizontal shift of the housing formed from the upper and the lower covers 5 and 54, the upper rocking arm 6 with round discs 65 will be brought by the biased weight 73 and the long bar 731 to sway above the other lower rocking arm 6 along the downward arched middle portion of the lower rocking arm 6. When the long bar 731 extended upward and pivotally connected between the two discs 65 swings sideward relative to the upper rocking arm 6, it will only move along the long slot 61 of the lower rocking arm 6 and the lower rocking arm 6 does not move. At this point, the toothed wheel 63 and the optical wheel 64 provided on the toothed wheel 63 of the upper rocking arm 6 are brought by the swinging long bar 731 to move in a circumferential direction. As in the case of the first embodiment, the toothed wheel 63 meshes with the gear 532 of one corresponding wheel 53 to rotate the wheel 53 and the optical wheel 531 thereon. And, when the weight 73 biases to bring the long bar 731 to swing forward and backward relative to the upper rocking arm 6, the long bar 731 will bring the lower rocking arm 6 to sway. That is, the bias of the weight 73 will bring the two rocking arms 6 to sway by different angles and the optical wheels 64 and 531 to move in circumferential direction between the phototransistors 81 on the circuit board 8, so that the phototransistors 81 sense the bias of the weight 73 and therefore the horizontal shift of the apparatus and the object having the apparatus mounted thereon.

Figure 10:
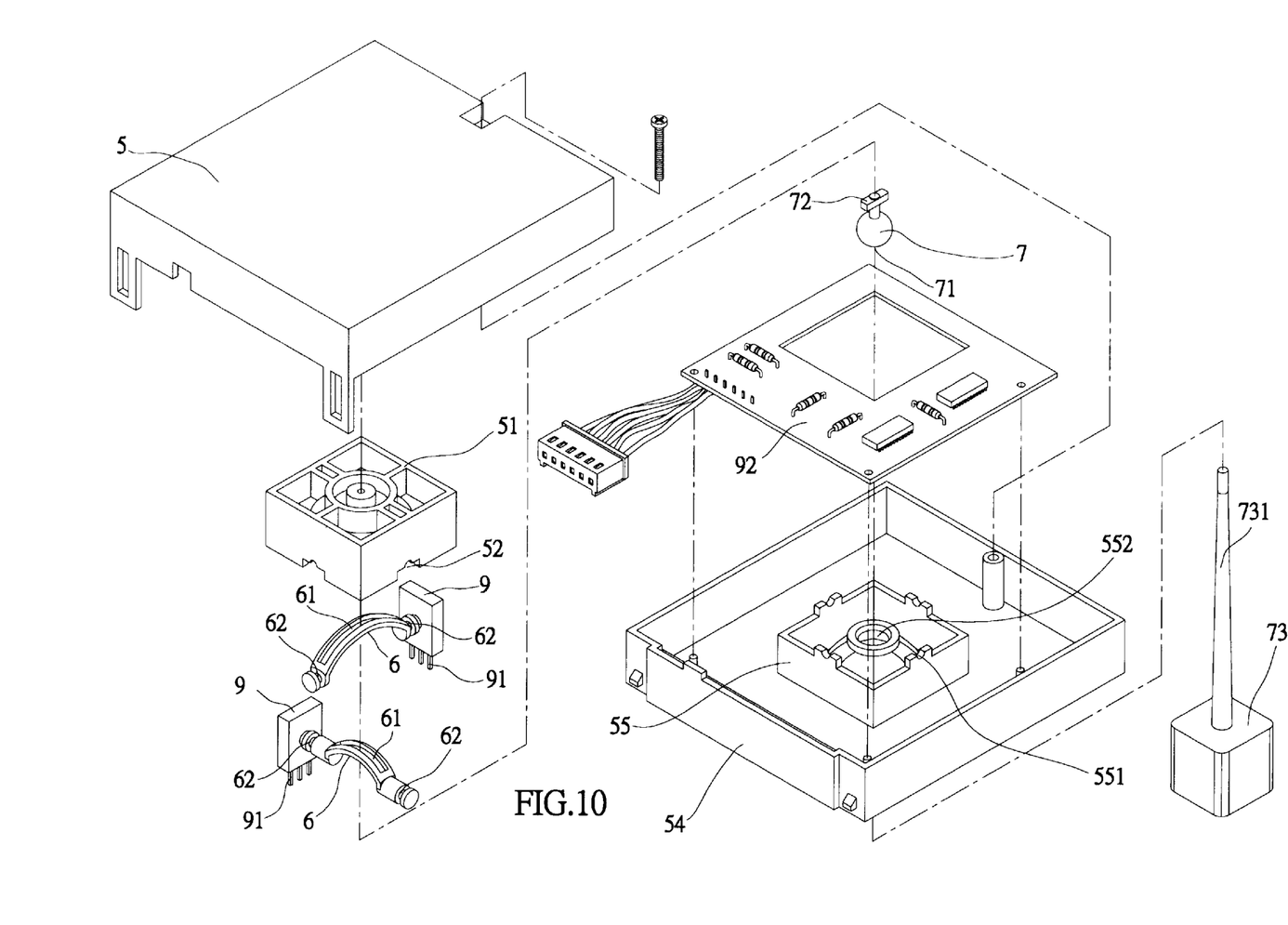
FIG. 10 is an exploded perspective of a gravity-type horizontal shift sensing apparatus according to a third embodiment of the present invention.
Figure 11:
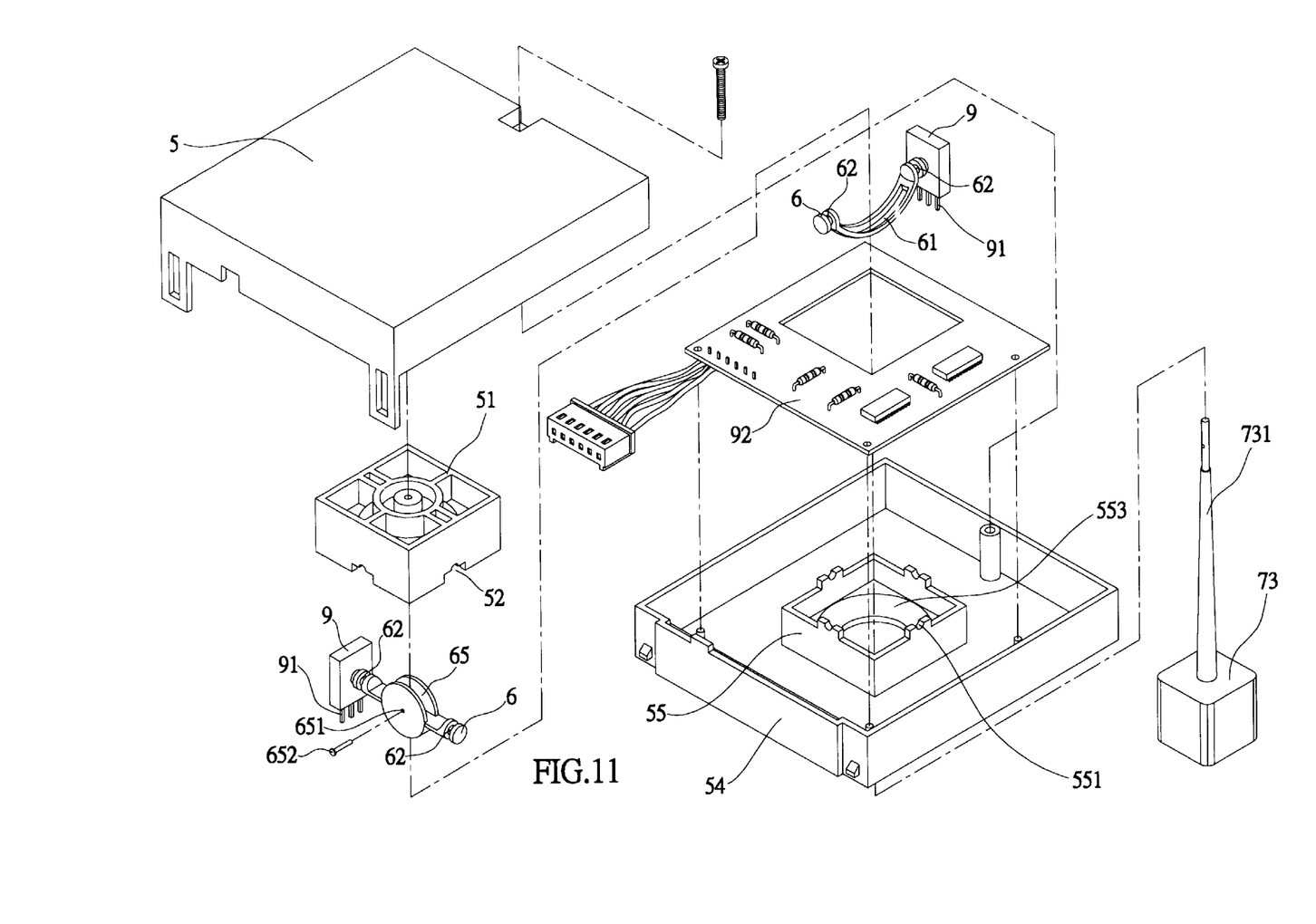
FIG. 11 is an exploded perspective of a gravity-type horizontal shift sensing apparatus according to a fourth embodiment of the present invention.

FIG. 10 is an exploded perspective of a third embodiment of the present invention mainly derived from the first embodiment shown in FIG. 3. And, FIG. 11 is an exploded perspective of a fourth embodiment of the present invention mainly derived from the second embodiment shown in FIG. 8.

The horizontal shift sensing apparatus in the third and the fourth embodiments all include an upper cover 5, an inner cover 51, a lower cover 54, two intersected rocking arms 6, a weight 7 having a long bar 731, and a circuit board (that is denoted by the reference numeral 92 in the latter two embodiments). The third and the fourth embodiments are different from the first and the second embodiments, respectively, only in that the rocking arms 6 do not have toothed wheels 63 and optical wheels 64 that are replaced by a variable resistance 9 on each rocking arm 6, and the wheels 53 with the optical wheels 531 and gears 532 are omitted.

The variable resistance 9 is provided at one end of the rocking arm 6 and has terminals 91 provided at a lower end surface thereof for electrically connecting to the circuit board 92. Values of the variable resistances 9 change when the weight 73 biases to cause the rocking arms 6 to sway. The values of the variable resistances 9 are sent to the circuit board 92 through the terminals 91 at the lower end surfaces of the variable resistances 9.

With the above arrangements, the gravity-type horizontal shift sensing apparatus of the present invention completely eliminates the drawbacks existing in the conventional horizontal shift sensing apparatus to largely improve the function and effect of such apparatus for use in industrial fields in a more practical manner.

What is claimed is:

1. A gravity-type horizontal shift sensing apparatus, comprising an upper cover, an inner cover, two rocking arms, a circuit board, a lower cover, and a weight;

said upper cover being closed onto said lower cover to form a housing into which said rocking arms and said circuit board are mounted; said lower cover being provided with a central inner seat that is provided at upper edges with cuts, said inner cover being closed onto said inner seat and being provided at lower edges with cuts corresponding to said cuts on said inner seat; said inner seat having a centered support for supporting a ball therein;

said rocking arm each having an arched middle portion and two shaft portions at two ends of said arched middle portion, a long slot being formed on said arched middle portion and two reduced necks being formed on said shaft portions; said rocking arms intersecting each other and being disposed between said inner cover and said inner seat with said reduced necks on said shaft portions located in said cuts of said inner cover and said inner seat, such that said rocking arms are allowed to freely sway or rotate between said inner cover and said inner seat;

said ball having a T-shaped head member and a bottom hole, said T-shaped head member being projected from said long slots on said arched middle portions of said two rocking arms, so that movements of said ball in different directions would be transferred via said T-shaped head member to cause said rocking arms to sway;

two wheels being separately mounted to outer side of said inner cover and said inner seat to each locate at one side of one said rocking arm, said wheel each having a full circle of optical wheel associated therewith and a coaxial gear sideward projected from a center of said wheel;

said circuit being disposed around said inner cover and said inner seat and being provided at predetermined positions with recesses, sensing elements, such as phototransistors or variable resistances, being mounted on said circuit board at two sides of said recesses;

said gravity-type horizontal shift sensing apparatus being characterized in that said rocking arm each including a toothed wheel provided at one end of said rocking arm outside said inner cover and said inner seat to mesh with said gear on said wheel located to one side of said rocking arm, that said toothed wheel each has a full circle of optical wheel provided along an outer periphery thereof, that said wheels and said toothed wheels each has a part along a circumference thereof extends into one said recess on said circuit board to locate between two said sensing elements mounted at two sides of each said recess, so that twofold sensing and accurate measuring of horizontal shift of an object on which said apparatus is mounted can be achieved, and that said weight having an upward extended long bar, and an upper end of which being tightly inserted into said bottom hole of said ball supported in said centered support of said inner seat, such that when said housing formed from said upper and said lower covers is horizontally shifted, said weight automatically biases under the gravitation to always maintain in a vertically downward position, and when said weight biases, said ball connected to said long bar opposite to said weight is brought to move and thereby causes said toothed wheels of said rocking arms and said wheels meshing with said toothed wheels to move in circumferential directions;

whereby when said gravity-type horizontal shift sensing apparatus is mounted on an object and moved along with the object, any difference in an angle of inclination of the object due to any horizontal shift of the object and accordingly said apparatus can be sensitively and accurately measured by employing the principle of gravitation without the need of using any manual manipulation means.

2. A gravity-type horizontal shift sensing apparatus as claimed in claim 1, wherein said wheels having said optical wheels and gears are omitted, and said toothed wheels having optical wheels on said rocking arms and said phototransistors on said circuit board are removed and replaced by variable resistances; and said variable resistances provided on said rocking arms having terminals provided at lower end surfaces thereof for electrical connection to said circuit board.

3. A gravity-type horizontal shift sensing apparatus as claimed in claim 1, wherein said arched middle portion of each said rocking arm can be either upward or downward arched.

4. A gravity-type horizontal shift sensing apparatus as claimed in claim 3, wherein one of said two intersected rocking arms that is located at an upper position is provided at two sides of said arched middle portion with two parallelly spaced round discs, said round discs having centered holes for a pin to extend therethrough; and wherein said long bar of said weight has a hole provided at an upper portion thereof; whereby said long bar may be upward extended through said long slots of said rocking arms to locate between said two round disc and be pivotally held thereto by extending said pin through said central holes on said round discs and said hole on the front portion of said long bar.

5. A gravity-type horizontal shift sensing apparatus as claimed in claim 2, wherein said arched middle portion of each said rocking arm can be either upward or downward arched.

\* \* \* \* \*